United States Patent [19]

Brenner

[11] Patent Number: 4,559,866
[45] Date of Patent: Dec. 24, 1985

[54] CROSSED-BELLOWS CONTROLLER

[75] Inventor: Paul Brenner, Steinheim, Fed. Rep. of Germany

[73] Assignee: Eckardt AG, Stuttgart, Fed. Rep. of Germany

[21] Appl. No.: 256,684

[22] Filed: Apr. 23, 1981

[30] Foreign Application Priority Data

Apr. 23, 1980 [DE] Fed. Rep. of Germany ....... 3015558

[51] Int. Cl.$^4$ ............................................. F01B 19/02
[52] U.S. Cl. ......................................... 92/39; 92/45; 92/48; 92/64; 92/76
[58] Field of Search ................... 92/37, 39, 45, 48, 64, 92/76, 38

[56] References Cited

U.S. PATENT DOCUMENTS 3,090,395  5/1963  Weiss et al. .............................. 92/39
4,179,244 12/1979  Marple ..................................... 92/37

FOREIGN PATENT DOCUMENTS 2719443  9/1978  Fed. Rep. of Germany .......... 92/76
 300881 11/1926  United Kingdom .................... 92/48

Primary Examiner—Robert E. Garrett
Attorney, Agent, or Firm—Craig & Burns

[57] ABSTRACT

A crossed-bellows controller which includes four bellows arranged in cruciform. The bellows are surrounded by a movable baffle ring which serves as a baffle plate for a nozzle. A frame-shaped cage is provided within the baffle ring, with the cage being connected through one pair of bellows with a central member. The baffle ring is connected with the cage through the other pair of bellows.

18 Claims, 2 Drawing Figures

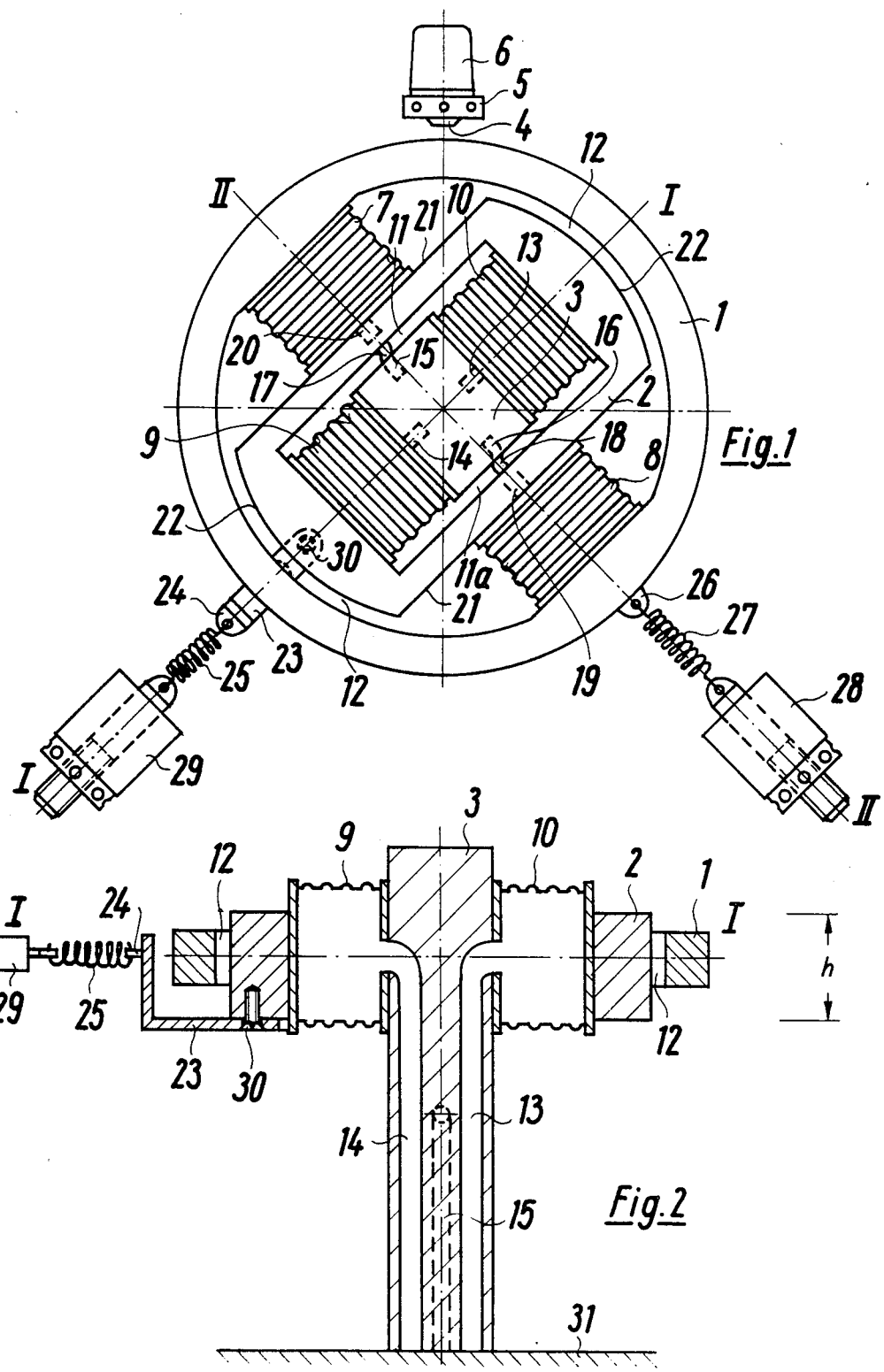

CROSSED-BELLOWS CONTROLLER

The present invention relates to a controller and, more particularly, to a crossed-bellows controller wherein four bellows, arranged in a cruciform, are surrounded by a movable baffle ring which simultaneously serves as a baffle or deflecting plate for a nozzle.

Crossed-bellows controllers have been proposed in, for example, "Messen und Regeln in der chemischen Technik" (Measurement and Control in Chemical Engineering) by Hengstenberg, Sturm and Winkler, 1964, Springer Publishers, Chapter 7, p. 1182, which controllers operate in accordance with a deflection or motion balance principle. In such proposed arrangement, the four bellows, surrounded by the baffle ring, have their externally located ends connected to the baffle ring and are mounted, with the ends pointing toward the center of the baffle ring, on a central member by way of which an air feed is effected. If pressure is increased in a bellows, the bellows expands while the opposed bellows is compressed. The pair of bellows arranged at an angle of 90° thereto are subjected to lateral stresses since the ends of this pair of bellows are fixedly connected to the central member and a force at a right angle to the bellows connecting axis is effective at the ends fixed to the baffle ring so that the bellows are flexed to a greater or lesser extent depending upon the pressure load. With a great pressure load, the lateral strain leads to a considerable zero point deviation which may strongly impair the controller function of the crossed-bellows controller and which can only be compensated for by repeatedly conducting a readjustment of the controller.

The aim underlying the present invention essentially resides in providing a crossed-bellows controller which minimizes if not avoids the introduction of lateral stresses on the bellows.

In accordance with advantageous features of the present invention, a frame-like cage is provided within the baffle ring, with the cage being connected to the central member by way of a pair of bellows. The baffle ring is connected to the cage by way of the other pair of bellows. By virtue of these features, the movements of the pair of bellows are decoupled and the bellows are placed merely under an axial stress. If an excess pressure is produced in the bellows arranged between the cage and the baffle ring, then this bellows expands and increases the distance between the baffle ring and the cage in a direction along an axis of expansion. At the same time, the bellows located in opposition to the first bellows is compressed and thus, on its side, reduces the spacing between the cage and the baffle ring. The pair of bellows lying between the cage and the central member is not set into motion by pressure applied in the external bellows. If a bellows arranged between the cage and central member is exposed to pressure, the cage will be displaced in a direction along an axis of expansion of the bellows under pressure stress and at the same time the bellows arranged between the cage and the baffle ring will be shifted parallel to their connecting axis in a direction of the axis of expansion of the pressure stressed bellows.

With a construction of the present invention, if both pair of bellows are exposed to pressure, the movement of the baffle ring is moved by a force resulting from the superposition of the two force components along the bellows pairs located at an angle of 90°.

In accordance with further advantageous features of the present invention, an air feed is effected to the inner bellows by way of the central member and the outer bellows by way of the cage. For this purpose, the air conduits for the externally located bellows are extended from the base plate for a suitable distance within the central member and from there by way of, for example, an elastic hose section, is continued through the cage to the outer pair of bellows and, consequently, the movement of the cage is not impaired by the provision of the air feed conduits.

In accordance with still further advantageous features of the present invention, a gap having a semi-circular segmental shape is disposed between the cage and the baffle ring in an area above heads of the interiorly disposed bellows. By virtue of the provision of formation of a gap in accordance with the present invention, the baffle ring can freely move with respect to the cage.

In accordance with further features of the present invention, the straight slot-like gap is provided between the insides of the cage and the central member so that the cage may be moved without friction with respect to the central member in a direction of the connecting axis of the interiorly disposed bellows.

Advantageously, the sides of the cage where the externally located bellows are mounted are constructed as parallel surfaces with respect to the connecting axis of the interiorly disposed bellows, with the ends of the cage on the head and base sides exhibiting a round or circular surface.

By virtue of the provision that the lateral surfaces of the cage are parallel surfaces to the connecting axis of the interiorly located bellows, the exteriorly disposed bellows may be firmly connected to the cage with their ends pointing toward the center of the baffle ring and, upon the application of pressure, the force effect on the cage, emanating from the two externally located bellows, lies on one axis which is effective at a right angle to the connecting axis of the interiorly disposed bellows.

By virtue of the provision of a circular or round surface at the head and base ends of the cage, these surfaces, on which the force of the internally disposed bellows is effective, are advantageously of a rugged construction or structure and are not deformed in cases of high pressure stress.

Advantageously, according to the present invention provision is made to effect an adjustment of the decoupled ring group in a direction of the connecting axis of the externally disposed bellows at the baffle ring and to effect the adjustment in a direction of the connecting axis of the interiorly disposed bellows by way of an angle member attached to the cage. By virtue of these features, advantageously, the cages engaging at the ring group for adjustment purposes are de-coupled and no lateral forces are exerted through the adjusting elements on the bellows.

Advantageously, the cage may be of the same height as the baffle ring; however, it is also possible for the cage to have a larger height than the baffle ring.

Accordingly, it is an object of the present invention to provide a crossed-bellows controller which avoids, by simple means, shortcomings and disadvantages encountered in the prior art.

Another object of the present invention resides in providing a crossed-bellows controller which is simple in construction and therefore relatively inexpensive to manufacture.

Yet another object of the present invention resides in providing a crossed-bellows controller which avoids the occurrence of lateral stresses on the bellows.

These and other objects, features, and advantages of the present invention will become more apparent from the following description when taken in connection with the accompanying drawing which shows, for the purpose of illustration only, one embodiment in accordance with the present invention, and wherein:

FIG. 1 is a top view of a de-coupled ring group of a crossed-bellows controller constructed in accordance with the present invention; and FIG. 2 is a cross sectional view taken along a connecting axis I—I in FIG. 1.

Referring now to the drawings wherein like reference numerals are used in both views to designate like parts and, more particularly, to FIG. 1, according to this figure, a de-coupled ring group of a crossed-bellows controller is provided and operatively connected to two adjusting devices 28, 29 and is arranged so as to be cooperable with a nozzle 6. The bellows controller includes a baffle ring 1 which is adapted to be shifted with respect to an orifice 4 of the nozzle 6 by the application of pressure into four bellows 7, 8, 9, and 10 arranged in a cruciform. Inner ends of the two bellows 9, 10 which point toward the center of the baffle ring 1 are fixedly joined to lateral sides of a square central member 3 which carries the ring group. Four air feed ducts 13, 14, 15 and 16 are incorporated within the central member 3, with the feed ducts 13, 14, as shown most clearly in FIG. 2, terminating in the bellows 9, 10 at a level of the connecting axis I—I lying along a longitudinal center axis of the respective bellows 9, 10. The two outer or externally disposed ends of the bellows 9, 10 are attached to two mutually opposing inner sides of a frame-shaped cage 2. The cage 2 is held in the baffle ring 1 by the bellows 9, 10 as well as by the two further bellows 7, 8 which externally engage at the cage 2.

The externally located bellows 7, 8 are mounted so that the inner ends pointing toward the center of the baffle ring 1 are fixedly joined to the outer lateral surfaces 21 of the cage 2. In order to enable a mounting of the bellows 7, 8 to the outer lateral surfaces 21 of the cage 2, the cage 2 is constructed so as to be narrower in a width direction or direction of a connecting axis II—II of the bellows 7, 8 than in a direction of the connecting axis I—I of the bellows 9, 10. Consequently, the cage 2 has an approximately rectangular frame shape. The outer or externally disposed ends of the bellows 7, 8 are firmly joined to the baffle ring 1.

The head and base sides of the cage 2 includes outer walls 22 which extend in parallel to the inner surfaces of the baffle ring 1. The cage 2 is dimensioned so that a gap 12, having the shape of a circular segment, is produced between the outer walls 22 of the cage 2 and the inner surface of the baffle ring 1. Likewise, the cage 2 has a width dimension such that two linearly extending gaps 11, 11a are provided between the outer surface of the central member 3 and the inner surface of the cage 2, with the gaps 11, 11a being disposed in parallel to the connecting axis I—I.

An angle member 23 is mounted at a base side of the cage 2 by a suitable fastening arrangement such as, for example, a screw connection 30. The angle member 23 is provided with an eye 24 lying at a level of the connecting axis I—I so that it is possible, by way of a spring 25, to displace and/or adjust the cage 2 with the baffle ring 1 along the connecting axis I—I by means of the adjusting device 29. Along the outer or lateral sides of the cage 2 an eye 26 is arranged on the baffle ring 1 at a level of the connecting axis II—II of the two externally disposed bellows 7, 8. A spring 27 is hung or suspended from the eye 26 and is capable of displacing the baffle ring 1 by way of the adjusting device 28 in the direction of the connecting axis II—II. By virtue of the angle member 23, an adjustment of the baffle ring 1 may be effected in a direction of the axis I—I through the angle member 23, connecting part 30, and the cage 2. The adjusting device 28 takes care of a zero-point adjustment or setting along the connecting axis II—II.

The controller operates in the following manner:

If the bellows 7 is exposed to a pressure, the bellows 7 will expand and increase or enlarge the distance between the outer lateral surface 21 of the cage 2 to which the inner end of the bellows 7 is connected and the baffle ring 1. At the same time, a distance between the oppositely disposed outer lateral surface 21 of the cage 2 and associated inner surface of the baffle ring 1 is reduced.

The above-noted movement of the baffle ring 1 along the connecting axis II—II does not affect the rest position of the bellows 9, 10 arranged between the cage 2 and the central member 3. by applying pressure in the bellows 10 arranged within the cage 2, the bellows 7, 8 and the baffle ring 1 are shifted in parallel to the connecting axis II—II and, accordingly, no lateral force component is effective at the bellows 7, 8. A superposition of the movements in the direction of the connecting axes I—I and II—II thus leads to a desired controller effect without any lateral stresses being exerted in the bellows.

The air supply to the externally located bellows 7, 8 takes place by way of the two ducts 16, 17 provided in the central member 3. The two ducts 16, 17 continue beneath the ring group on the sides of the central member 3 facing the bellows 7, 8 with air being fed by way of, for example, two flexible hose sections 17, 18 to two feed conduits 19, 20 incorporated in the cage 2 along the lateral sides thereof, whereby the air is then introduced into the bellows 7, 8. By virtue of the use of movable or flexible hose sections, any impediment to the movement of the cage 2 is prevented.

As shown in the cross sectional view of FIG. 2 through a decoupled ring group of a crossed-bellows controller, the two air feed conduits 13, 14 are incorporated in the central member 3 with the central member 3 being fixedly joined to a housing 31. As noted above, the air feed conduits 13, 14 terminate in a zone of the central bellows connecting axis I—I so as to communicate with the bellows 9, 10 arranged between the central member and the cage 2. The cage 2 is surrounded by the baffle ring 1 with the gas 12 being provided between the outer surfaces 22 and the inner surface of the baffle ring 1.

As also shown in FIG. 2, a height h of the cage 2 may be larger than that of the baffle ring 1 so as to provide a sufficient space for accommodating, on an underside of the base side end of the cage 2, the angle member 23 by means of the screw connection 30. The angle member carrying the eye 24, enables an adjustment of the cage 2 and thus the baffle ring 1 along the connecting axis I—I. However, it is also possible to dimension the cage 2 so as to have exactly the same height h as the baffle ring 1 and then to utilize another suitably shaped angle member for enabling an adjustment.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A controller comprising four bellows means arranged in a cruciform, a movable baffle ring means surrounding the bellows means, means for connecting the bellows means to the baffle ring means and a central supporting member, the connecting means includes a frameshaped cage member disposed within the baffle ring means for accommodating a first pair of the bellows means, the first pair of bellows means being connected to the central supporting member and to the cage member, a second pair of the bellows means are disposed externally of the cage member and connect the cage member to the baffle ring means.

2. The controller according to claim 1, wherein the cage member includes a head portion, a base portion disposed oppositely to the head portion, and a pair of spaced side portions for connecting the head portion to the base portion, the second pair of bellows means includes inner ends respectively mounted on the side portions of the cage member, and the first pair of bellows means includes outer ends respectively mounted to the base portion and the head portion.

3. The controller according to claim 2, wherein the side portions extend substantially parallel to a connecting axis of the first pair of bellows means, and the head portion and base portion have an arcuate configuration.

4. The controller according to claim 3, wherein the cage member is dimensioned such that a gap having a circular segmental shape is formed between the base portion and head portion and assoicated inner surfaces of the baffle ring means, and a gap is formed between an inner surface of the respective side portions and the supporting member.

5. The controller according to claim 4, wherein the gap formed between the inner surface of the respective side portions and the supporting member is linear and is disposed approximately parallel to the connecting axis of the first pair of bellows means.

6. The controller according to claim 5, wherein means are provided in the central supporting member for supplying pressure to the respective bellows means for enabling an operating of the controller.

7. The controller according to claim 6, wherein the pressure supply means includes a plurality of pressure supplying conduits, two of the plurality of conduits respectively terminating in the first pair of bellows means, and means are provided for connecting the remaining conduits to the second pair of bellows means in a manner so as not to impede a relative movement between the cage member and the baffle ring means.

8. The controller according to claim 7, wherein the means for connecting the remaining conduits include further conduits provided in each of the side portions, and flexible hose means interposed between the conduits in the side portions and the remaining conduits in the central supporting member.

9. The controller according to claims 3, 4, 5, 6, 7, or 8, wherein first means are provided for adjusting the controller in a direction of the connecting axis of the first pair of bellows means, and second means are provided for adjusting the controller in the direction of a connecting axis of the second pair of bellows means.

10. The controller according to claim 9, wherein the first adjusting means includes an angle member attached to the cage member, and the second adjusting means includes a connecting eye means mounted on the baffle ring means.

11. The controller according to claim 10, wherein the first adjusting means further includes an adjusting device and a spring means interposed between the angle member and the adjusting device, and the second adjusting means further includes a further adjusting device and a further spring means interposed between the further adjusting device and the connecting eye means.

12. The controller according to claim 11, wherein the cage member has a height equal to a height of the baffle ring means.

13. The controller according to claim 11, wherein the cage member has a height larger than a height of the baffle ring means.

14. The controller according to claims 1 or 2, wherein means are provided in the central supporting member for supplying pressure to the respective bellows means for enabling an operating of the controller.

15. The controller according to claim 14, wherein the pressure supply means includes a plurality of pressure supplying conduits two of the plurality of conduits respective terminating in the first pair of bellows means, and means are provided for connecting the remaining conduits to the second pair of bellows means in a manner so as not to impede a relative movement between the cage member and the baffle ring means.

16. The controller according to claim 15, wherein said two of the plurality of conduits terminate in an area of a connecting axis extending between the first pair of bellows means.

17. The controller according to claims 1, 2, or 3, wherein the cage member has a height equal to a height of the baffle ring means.

18. The controller according to claims 1, 2, or 3, wherein the cage member has a height larger than a height of the baffle ring means.

* * * * *